Patented Feb. 7, 1928.

1,658,289

UNITED STATES PATENT OFFICE.

FRITZ HEIDLBERG, OF PHILADELPHIA, PENNSYLVANIA.

PROTECTIVE COLLOID AND PROCESS OF PREPARING THE SAME.

No Drawing. Application filed January 31, 1921, Serial No. 441,506. Renewed June 2, 1927.

One object of this invention is to provide a protective colloid of novel composition and also a method of preparing the same without departing too far from the original composition of the native proteid; said colloid being of such a nature as shall provide or constitute a substance suitable for the preparation of various colloidal compounds of definite chemical composition.

It is further desired to provide a novel process for preparing certain elements and compounds in colloidal form, which shall be simple, easily carried out, and of such a nature as to require but relatively short times for its operation.

In carrying out my invention I prepare a protective colloid solution by subjecting a neutral casein-sodium solution (for example) to the action of a suitable animal or vegetable ferment, such as pepsin, trypsin, papain, etc. I so control this digestion as to separate its product into two distinct fractions, one of which is particularly suitable for the manufacture of stable, rapid scaling, colloidal salts.

In a typical case I dissolve five hundred grams of casein in four thousand cc. of water, with one hundred cc. of a twenty per cent solution of sodium hydroxide and maintain said solution at a temperature of about 40 degrees C. I then add a solution of fifty grams of papain while stirring the first solution. A reaction immediately begins, the liquid becoming more and more milky in appearance until within a few minutes a large amount of digested proteid settles out of the solution in the form of a precipitate constituting about half of the original casein, the other half of said casein remaining in the supernatant liquid. The precipitate is then separated and after being washed with water, is redissolved in about one hundred cc. of a twenty per cent solution of sodium hydroxide, it being noted that it is originally formed only when the above amounts of alkaline solutions have been employed.

While both of the above fractions constituting the product of the reaction possess valuable properties as protective colloids, I prefer the precipitated fraction since if its solution in the sodium hydroxide be evaporated to dryness, it forms scales which easily separate from the drying pan, thus making it a commercially easy matter to prepare scale salts. Another advantage of the protective colloid constituted by the precipitated fraction of the above reaction is due to the fact that when in a neutral or alkaline solution it is almost completely precipitated by acids, thus rendering easy the purification of colloidal salts prepared from it.

It is to be understood that I do not limit myself to the exact details of the above described process for the preparation of the protective colloid, since while as noted I prefer to employ the ingredients in the proportions noted, I may employ more than one hundred cc. of the sodium hydroxide solution, for example three hundred cc., in which case the digestion of the proteid proceeds without the precipitation otherwise noted but none the less provides a solution having valuable properties as a protective colloid.

In place of papain I may employ a ferment such as trypsin and in a typical case dissolve five hundred grams of casein with twenty grams of a twenty per cent solution of sodium hydroxide and two thousand cc. of water, together with sufficient pancreatin (from five to ten grams, according to its trypsin content) and digest the whole at a temperature of 37 degrees to 50 degrees C. for one hour. The solution is then heated to the boiling point to destroy the remaining ferment, after which it may be filtered and concentrated.

In utilizing the protective colloid above described, to prepare different colloidal compounds, I preferably, though not necessarily, employ that fraction of proteid that is precipitated by the fractionated digestion of casein with papain. In preparing colloidal metallic silver for example, the silver salt is reduced in the presence of a sufficient amount of my protective colloid, and the resulting salt may be made to contain various amounts of silver according to the proportions in which the colloid and the silver salt are employed.

For example, to prepare two hundred and fifty grams of metallic colloidal silver containing in its dry state twenty-five per cent of metallic silver, I dissolve one hundred grams of silver nitrate in two hundred cc. of water and add sufficient ammonia water to dissolve the first formed precipitate of silver oxide. I then add a sufficient amount of my protective colloid solution, in the present instance a volume containing 187.5 grams of dry proteid substance. The precipitate which now occurs is redissolved by an excess of an alkali, preferably sodium hydroxide, and although only 21.3 grams of this are theoretically required to neutralize the silver nitrate, I employ the excess i. e., about one hundred grams, in order to form a perfectly soluble colloidal silver. After the addition of the latter, the solution rapidly assumes a dark brown color and it is then heated slowly to about 100 degrees C., at which temperature it is maintained until all of the silver is reduced.

This final condition may be conveniently determined by transferring five cc. of the solution to a test tube and adding sufficient sulphuric acid, for example, to precipitate the colloid. After this precipitate has been filtered off, I add to the filtrate a few drops of sodium hydro-sulphite solution or other suitable reducing agent. If all of the silver has not been reduced, a dark color will appear, but the solution will remain clear if the contrary is the case.

After all of the silver has been brought to the metallic state, I may follow either of two methods for further purifying it. i. e., by dialysis or by precipitating the colloidal silver and protective colloid by a mineral or organic acid, for example twenty per cent sulphuric acid will serve this purpose. I then collect the precipitate and after decantation, wash it with water and redissolve it in alkali to make the solution neutral.

In order to prepare colloidal silver iodide, the following procedure has been found to give a clear and stable colloidal product. If it is desired to obtain two hundred and fifty grams of colloidal silver iodide containing twenty-five per cent silver iodide, I dissolve 45.1 grams of silver nitrate in two hundred and fifty cc. of water and also prepare a solution of 44.3 grams of potassium iodide in two hundred and fifty cc. of water. I then add ammonium hydrate to the silver nitrate solution until the first formed precipitate is redissolved, and then add said solution to a solution of my protective colloid containing one hundred and eighty-seven grams of dry protective colloid. After completely mixing this solution the potassium iodide solution is added and it is to be noted that the order of the above described operations may be varied if desired, since it is possible to divide the protective colloidal solution between the silver nitrate and potassium iodide solutions or to employ other variations in the mixing operation,—the essential feature of this step of the process residing in causing the silver nitrate to react with the potassium iodide in the presence of the protective colloid.

The resulting product may be purified by dialysis or by precipitation by means of a mineral or organic acid, i. e., a twenty per cent solution of sulphuric acid. The precipitate after decantation and washing is redissolved in an alkali, such as caustic soda, and further treated to obtain the desired colloidal product, as by evaporation to dryness.

To prepare colloidal red iodide of mercury I proceed as follows:—to obtain two hundred and fifty grams of red colloidal iodide of mercury containing twenty-five per cent $HgI^2$, I dissolve first thirty-seven grams of mercuric chloride in two hundred and fifty cc. of water with the addition of ten grams of sodium chloride to facilitate solution. I next prepare a solution of forty-five and seven tenths grams of potassium iodide in two hundred and fifty cc. of water. I next prepare a solution of sixty grams of potassium hydroxide in two hundred and fifty cc. of water and finally a solution of two hundred and fifty cc. of ammonium hydroxide (26%). The solution of my protective colloid, containing one hundred and eighty-seven grams of dry colloid, is next placed in a suitable precipitation vessel and the above solutions are added, the mercuric chloride preferably first, then the potassium hydroxide, then the ammonium hydroxide, and finally the potassium iodide. The resulting solution thereupon assumes a dark red color, due to the formation of mercuric iodide, and it may now be purified in the usual way by dialysis or otherwise.

It is to be noted that one of the valuable and novel features of my invention is the production of colloidal mercuric iodide which has a distinctive red color both in its solid and liquid forms, since so far as I am aware, said compound has not had and could not be made to have, said color when in colloidal form.

I claim:

1. The process which consists in preparing a solution of a proteid and an alkali sufficient to neutralize the acid digestion products formed; adding papain to said solution in the proportion necessary to form a precipitate of definite protective colloid properties; separating said precipitate from the liquid; and redissolving the precipitate in sufficient alkali to make it neutral.

2. The process which consists in dissolving casein in a solution of sodium hydroxide in the proportion of five hundred grams of casein to one hundred cc. of a twenty per cent solution of hydroxide, at a temperature of about forty degrees C.; adding about fifty grams of papain; and separating the resulting definite protective colloid precipitate from the liquid.

3. The process which consists in dissolving casein in a solution of sodium hydroxide in the proportion of five hundred grams of casein to one hundred cc. of a twenty per cent solution of hydroxide, at a temperature of about forty degrees C.; adding about fifty grams of papain; separating the resulting definite protective colloid precipitate from the liquid; washing the precipitate; then redissolving it in about one hundred cc. of a twenty per cent solution of sodium hydroxide; and finally evaporating said solution to dryness.

4. The process which consists in dissolving casein in a solution of sodium hydroxide in the proportion of five hundred grams of casein to one hundred cc. of a twenty per cent solution of hydroxide at a temperature of about forty degrees C.; adding about fifty grams of papain; and separating the resulting definite protective colloid precipitate from the liquid.

5. The process of forming a protective colloid solution which comprises adding papain to a solution of a proteid in the presence of an excessive alkali in order to form a stable solution having definite protective colloid properties.

6. As a new composition of matter, a stable solution having definite protective colloid properties comprising the reaction product obtained by reacting papain with a proteid in the presence of an excessive alkali.

7. As a new article of manufacture, a solution having protective colloid properties obtained by adding papain to a neutralized solution of a proteid and an alkali with the subsequent separation of the precipitate, and the redissolution of the precipitate in sufficient alkali to make it neutral.

FRITZ HEIDLBERG.